(12) United States Patent
Vogt et al.

(10) Patent No.: US 10,296,483 B2
(45) Date of Patent: May 21, 2019

(54) FIELDBUS NETWORK WITH TWO-WIRE LOOP

(71) Applicant: Phoenix Contact Development and Manufacturing, Inc., Middletown, PA (US)

(72) Inventors: Brian Vogt, Harrisburg, PA (US); Michael Colin Cherewka, Mechanicsburg, PA (US); Brent Helfrick, Middletown, PA (US); Aaron Kreider, Elizabethtown, PA (US); Davis Mathews, Lewisburg, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 105 days.

(21) Appl. No.: 15/109,199

(22) PCT Filed: Jan. 2, 2015

(86) PCT No.: PCT/US2015/010032
§ 371 (c)(1),
(2) Date: Jun. 30, 2016

(87) PCT Pub. No.: WO2015/103469
PCT Pub. Date: Jul. 9, 2015

(65) Prior Publication Data
US 2016/0328351 A1    Nov. 10, 2016

Related U.S. Application Data

(60) Provisional application No. 61/923,402, filed on Jan. 3, 2014.

(51) Int. Cl.
*G06F 13/42* (2006.01)
*H04L 12/40* (2006.01)
(Continued)

(52) U.S. Cl.
CPC ....... *G06F 13/426* (2013.01); *G05B 19/4185* (2013.01); *G06F 13/385* (2013.01);
(Continued)

(58) Field of Classification Search
None
See application file for complete search history.

(56) References Cited

U.S. PATENT DOCUMENTS 8,625,295 B2 *  1/2014  Alley ................. G06F 13/4086
                                                  361/760
2005/0228509 A1  10/2005  James
(Continued)

FOREIGN PATENT DOCUMENTS

EP    1906601 A1    4/2008
GB    2473142 A     3/2011
(Continued)

OTHER PUBLICATIONS

International Search Report in corresponding PCT/US2015/010332, European Patent Office, dated Mar. 18, 2015, 12 pages.

*Primary Examiner* — Henry Tsai
*Assistant Examiner* — John B Roche
(74) *Attorney, Agent, or Firm* — Hooker & Habib, P.C.

(57) ABSTRACT

A fieldbus coupler for coupling a local fieldbus network utilizing a first fieldbus protocol to a foreign field device or foreign fieldbus network through an interconnecting wired or wireless network transmission line that utilizes a second fieldbus protocol different from the first fieldbus protocol includes a first circuit configured to communicate over the local fieldbus network using the first fieldbus protocol, a second circuit configured to connect the fieldbus coupler with the interconnecting network transmission line and communicate over the interconnecting network transmission line using the second fieldbus protocol, and a third circuit
(Continued)

configured to communicate with the first and second circuits and capable of transmitting data to and from the first and second circuits to enable communications between the local fieldbus network via the interconnecting network transmission line.

20 Claims, 14 Drawing Sheets

(51) Int. Cl.
  *G05B 19/418*  (2006.01)
  *G06F 13/38*  (2006.01)
(52) U.S. Cl.
  CPC ........ *H04L 12/40* (2013.01); *H04L 12/40182* (2013.01); *H04L 12/40189* (2013.01); *G05B 2219/31122* (2013.01); *G05B 2219/31135* (2013.01); *G05B 2219/31369* (2013.01); *H04L 2012/40221* (2013.01); *H04L 2012/40228* (2013.01); *H04L 2012/40234* (2013.01); *Y02P 90/18* (2015.11)

(56) References Cited

U.S. PATENT DOCUMENTS

| | | |
|---|---|---|
| 2006/0155908 A1 | 7/2006 | Rotvold |
| 2010/0222936 A1 | 9/2010 | Helfrick et al. |
| 2011/0010476 A1* | 1/2011 | Kreider ................... H04L 12/10 710/106 |
| 2011/0131455 A1* | 6/2011 | Law ........................ H04B 3/548 714/40 |
| 2012/0035749 A1 | 2/2012 | Schleiss et al. |
| 2012/0102240 A1* | 4/2012 | Wei ....................... H04L 12/403 710/30 |
| 2012/0310378 A1* | 12/2012 | Smith ................. H04L 41/0853 700/79 |

FOREIGN PATENT DOCUMENTS

| | | |
|---|---|---|
| JP | 2008527916 A | 7/2008 |
| JP | 2012038302 A | 2/2012 |
| WO | 2008127657 A1 | 10/2008 |

* cited by examiner

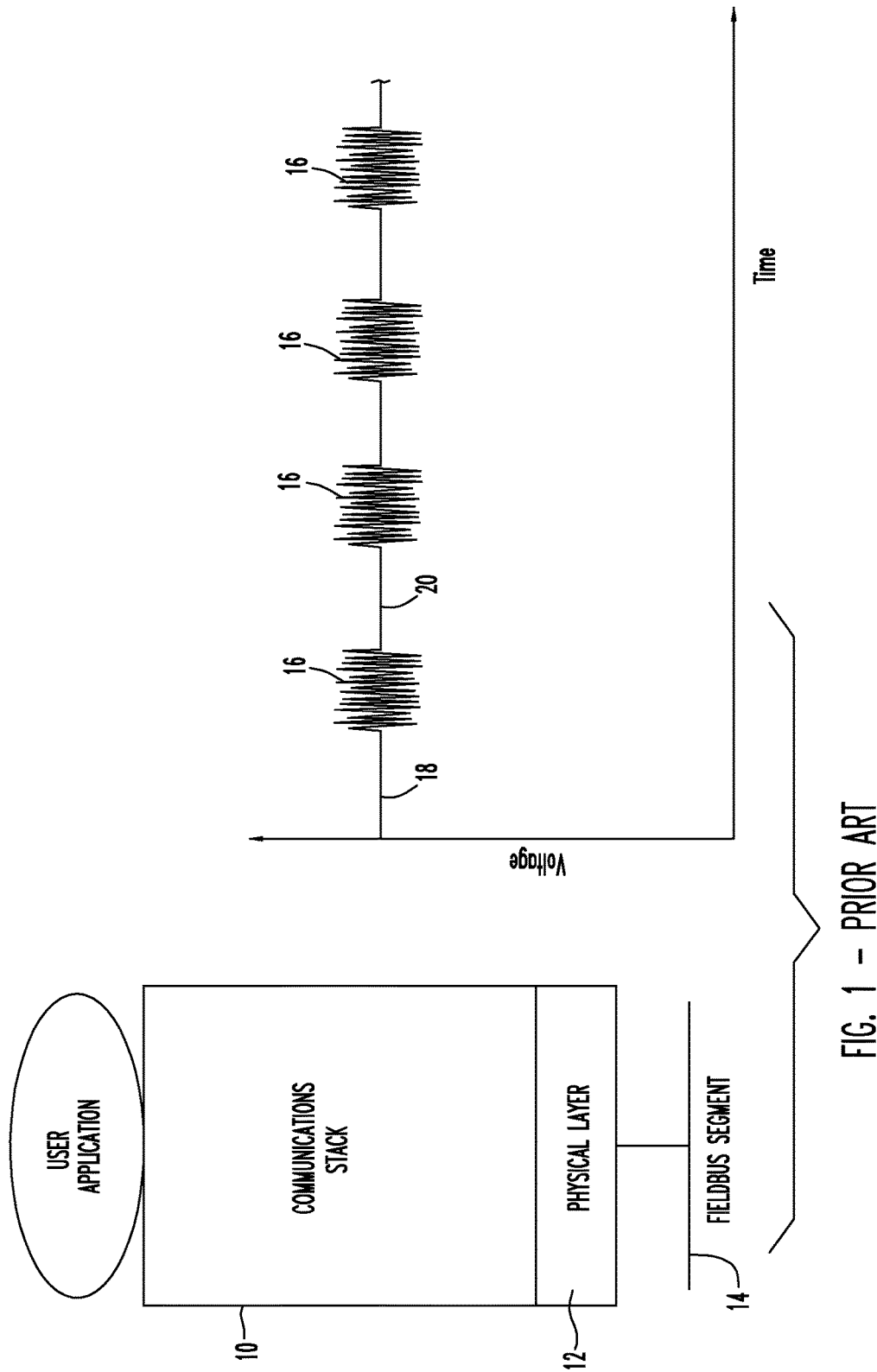
FIG. 1 – PRIOR ART

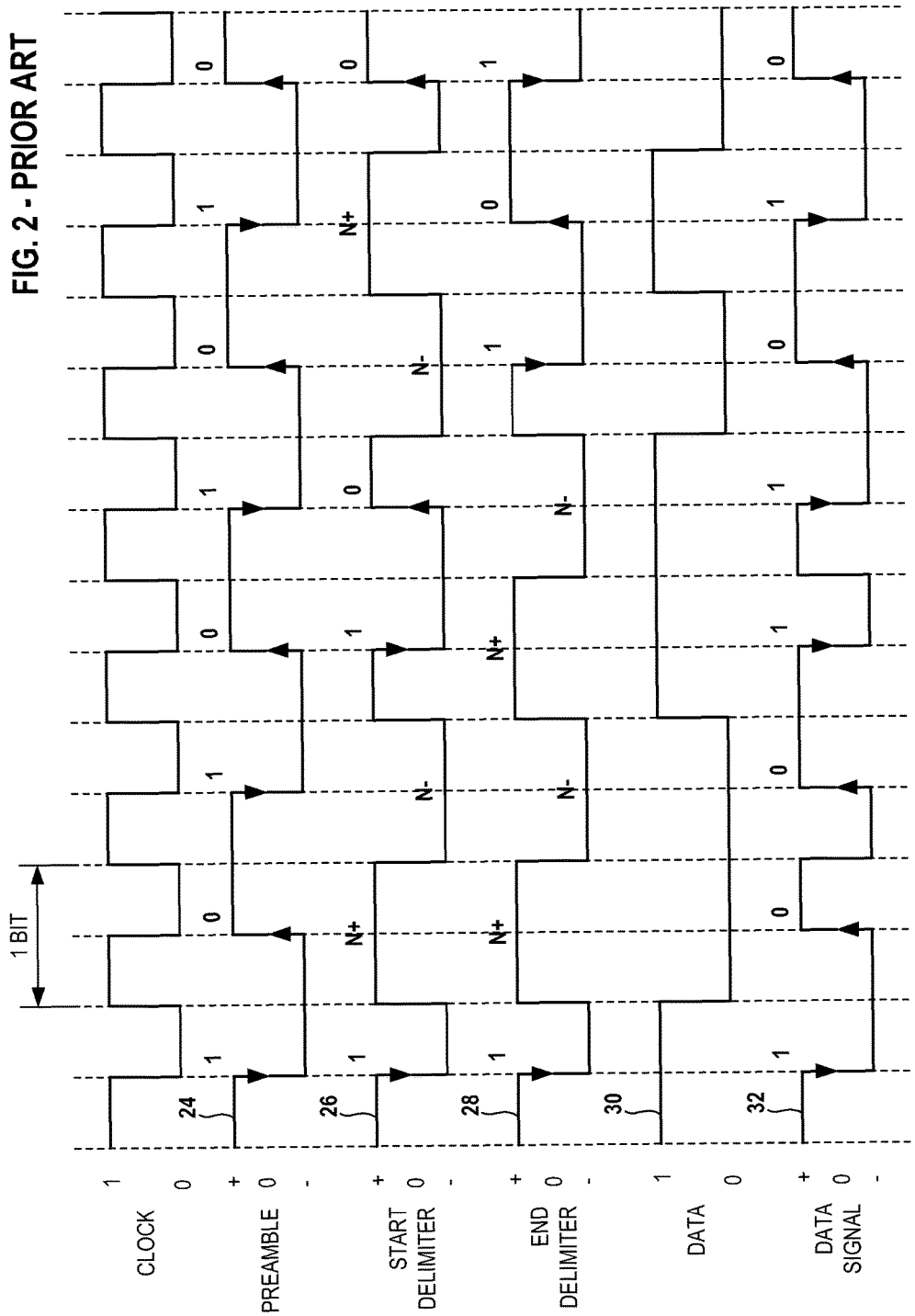

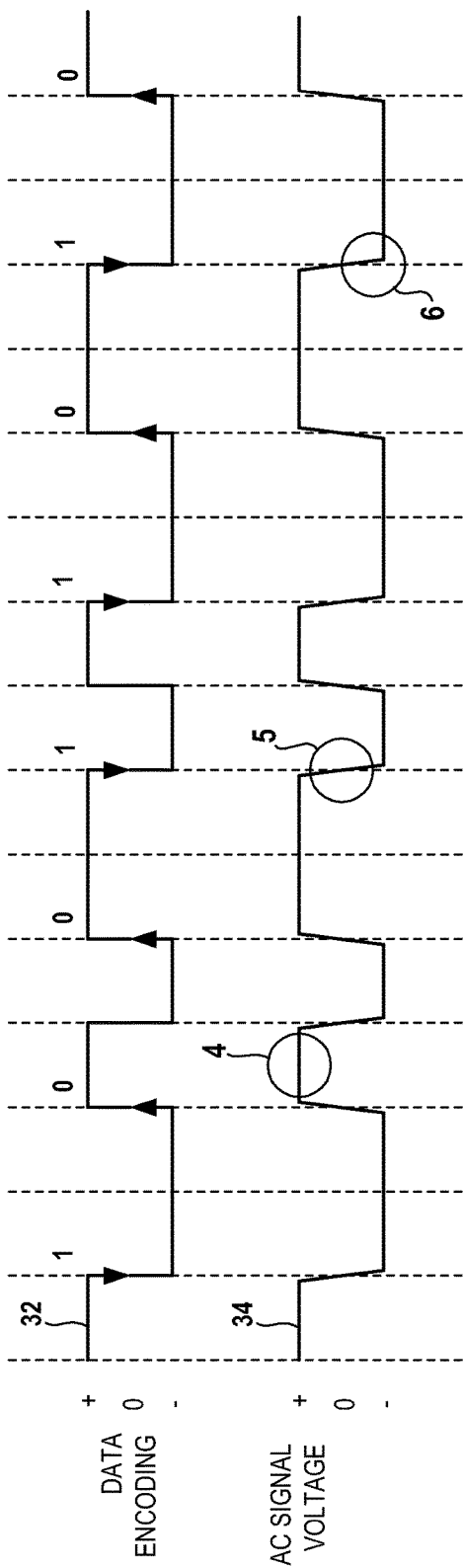
FIG. 3 - PRIOR ART
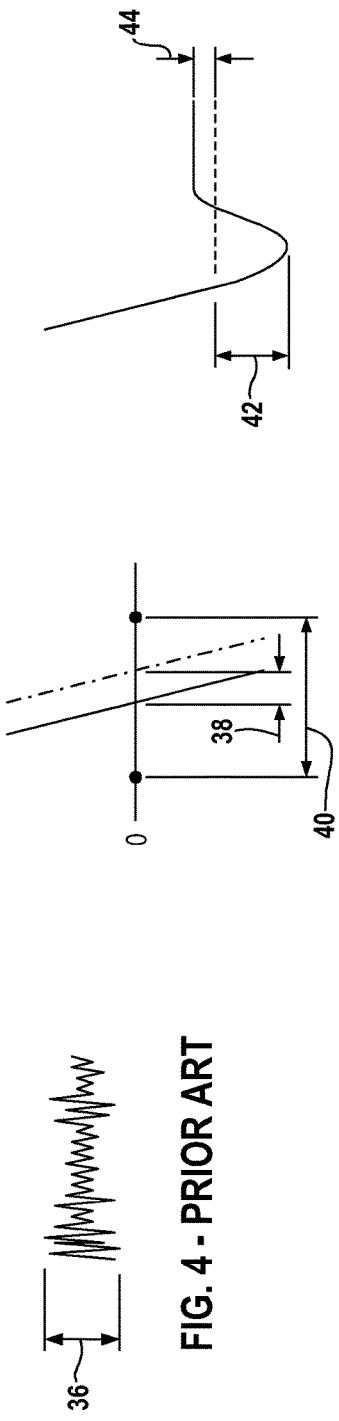
FIG. 6 - PRIOR ART
FIG. 5 - PRIOR ART
FIG. 4 - PRIOR ART

FIELDBUS NETWORK WITH TWO-WIRE LOOP

FIELD OF THE DISCLOSURE

The disclosure related to fieldbus technology for controlling industrial processes, and more specifically, to fieldbus technology in which data and power to field devices are transmitted through a two-wire loop.

BACKGROUND OF THE DISCLOSURE

A fieldbus is a network used in process automation in which field devices form some of the nodes on the network and a head station or host forms one of the nodes on the network. The network may include a trunk or home run connected to a power supply and spurs that extend from the trunk, with field devices forming nodes on the spurs. The function of the fieldbus network is to transmit data to and from the nodes in a reliable and timely manner.

A fieldbus network typically bases its communications protocols upon the Open Systems Interconnection model (OSI) that is maintained by the International Organization for Standardization (ISO) as ISO/IEC 7498-1. The OSI model defines a hierarchical, layered communications stack in which data is converted to and from data frames for transmission on the network. Each layer provides services to the layers directly above and below it.

The lowest layer of the OSI model is the physical layer. The physical layer handles converting data frames to and from the electrical signals transmitted on the network. The physical layer defines the physical and electrical specifications of the network (network topology, wiring specifications, voltages, line impedance, etc.) and how the data frame is represented on the network (for example, Manchester coding, return to zero coding, nonreturnable to zero inverted coding, and the like).

Many fieldbus networks utilize a two-wire loop defined by the physical layer specifications. The two-wire loop transmits power to the nodes and is used for data communications between the nodes and the host. Power is usually transmitted by a DC voltage carried on the loop, and data is communicated by superimposing an AC data signal on the DC voltage. Fieldbus networks that utilize a two-wire loop include FOUNDATION FIELDBUS H1, PROFIBUS PA, and ETHERNET based networks including POWER OVER ETHERNET (POE) networks (note that a wired fieldbus network may include other wires in addition to those used in the two-wire loop).

FIG. 1 schematically illustrates a fieldbus communications stack 10 having a physical layer 12 that is connected to a two-wire loop (represented by the single line 14) to transmit and receive data frames 16 over the loop 14. Each data frame 16 is defined by an AC data signal superimposed over a DC voltage 18. The data frames 16 are separated by a "quiet time" 20 between frames that avoids collisions and interference between data frames. The physical layer specifications define the encoding of the AC data signal and how collisions of data frames are avoided.

FIG. 2 schematically illustrates the encoding of a data frame 16 for a FOUNDATION FIELDBUS H1 fieldbus network (the DC component is omitted). The data bits are transmitted at a frequency of 31.25 kHz as indicated by the clock signal 22, that is, the bit time is $\frac{1}{31,250}$th of a second.

The data portion of each data frame 16 is encoded using a synchronous Manchester coding technique in which a positive voltage change in the middle of the bit time represents a logical "0" and a negative voltage change in the middle of the bit time represents a logical "1". Special codes are defined for the preamble 24, and for the start delimiter 26 and end delimiter 28 of the data frame 16.

A node on the fieldbus network uses the preamble 24 to synchronize its internal clock with the incoming data frame 16, and uses the start delimiter 26 to find the beginning of the data portion of the data frame 16. After finding the start delimiter 26, the node accepts data until receipt of the end delimiter 28. The start and end delimiters 26, 28 include N+ and N− signals that do not change voltage in the middle of the bit time to assist the node in recognizing the start and end delimiters.

FIG. 2 illustrates data 30 as including a sequence of logical bytes 10011010 which are encoded in the date frame 16 as data signal 32. The fieldbus communication protocol defines the maximum and minimum number of data bits that are included within a data frame 16.

Data signal 32 represents the ideal AC voltage signal that should be transmitted on the two-wire loop 14. Due to the physical characteristics of the two-wire loop 14 and the surrounding physical environment, the actual AC voltage signal will vary from the ideal voltage signal 32. FIG. 3 illustrates the actual AC voltage signal 34 as compared to the idealized voltage signal 32.

Some of the signal departures from ideal include signal noise, jitter, and overshooting. FIG. 4 illustrates signal noise having a maximum amplitude 36. FIG. 5 illustrates jitter 38, which is the time difference between the AC signal transition crossing the zero voltage line and the midpoint of the bit cycle. Fieldbus protocols typically define acceptable jitter limits 40. FIG. 6 illustrates a transient overshoot having a magnitude 42, as well as the AC signal having a DC offset having a magnitude 44. Other signal departures from the ideal include misshapen waveforms, too high or too low DC power levels, voltage spikes, and the like. Because these signal departures and waveform variations from the ideal are well known in the fieldbus art, they will not be discussed in further detail.

The demands of a standardized fieldbus communications protocol makes it difficult for a fieldbus network to communicate with other fieldbus networks having a different communications protocol.

Furthermore, the demands of a fieldbus communications protocol requires the physical layer of the fieldbus network be maintained for reliable operation of the network. Physical layer diagnostic devices are known that connect to the two-wire loop 14 and monitor the physical layer of the fieldbus network, measuring and evaluating bus voltage, signal noise, retransmission counts, shield shorts, signal levels, and other electrical and physical parameters and events as is known in the fieldbus physical layer diagnostics art.

An example known fieldbus physical layer diagnostic device is the Field Diagnostic Module sold by Phoenix Contact GmbH, Blomberg, Germany. The diagnostics module provides data from AC and DC electrical-related measurements useful for evaluating the health of the physical layer of the fieldbus network.

Some physical layer diagnostic devices are designed to be attached on the trunk near the power supply. However, especially in the case of isolated or voltage-regulated spurs, the electrical parameters on the spurs are not the same as the trunk. Additional information, such as current draw, of individual field devices may not be available to diagnostic devices attached to the trunk. Other diagnostic devices are designed to be attached to spurs and the diagnostic device includes communications circuitry to communicate over the field bus network. But adding such diagnostic devices to spurs is expensive.

Some fieldbus physical layer diagnostic devices incorporate an oscilloscope within the diagnostic device. The oscilloscope may be the sole diagnostic tool provided by the device, or may part of a set of diagnostic tools provided by the device. The oscilloscope enables a user to continuously monitor the fieldbus communications and view the signal waveforms. The oscilloscope provides diagnostic information about the waveforms for analysis.

Because oscilloscopes sample the waveform at a relatively high frequency (higher than the bit frequency of the waveform), delivering the data stream generated by the oscilloscope through the two-wire loop is impractical. Instead, the oscilloscope data stream is transferred out of the field device using a dedicated, higher bandwidth communication channel and not through the fieldbus network itself. The electrical connections between the fieldbus network and the oscilloscope communication channel must also be isolated from one another. This hinders use of an oscilloscope as an effective diagnostic tool for fieldbus networks.

BRIEF SUMMARY OF THE DISCLOSURE

Disclosed is a fieldbus network that includes a modular device coupler having dedicated spur diagnostics circuitry for each spur, a modular remote field coupler for coupling the local fieldbus network to one or more remote fieldbus networks, and a diagnostic device that includes an integral oscilloscope, the diagnostic device powered by and communicating over the fieldbus network.

Disclosed in one aspect of the disclosure is a modular device coupler for connecting spurs to a trunk that includes a gateway module and one or more spur modules communicating power and data over a local bus. The gateway module acts as a field node on the fieldbus network drawing power from the fieldbus loop to power the gateway module and the local bus, and handling communications between the fieldbus network and the local bus. Each spur module has terminals for attaching a spur and some embodiments include diagnostics circuitry dedicated to physical layer diagnostics of the attached spur. The spur module draws power from the local bus and uses the local bus for data communications (including diagnostic communications) between the spur module and the gateway module.

Disclosed in another aspect of the disclosure is a remote fieldbus coupler that connects non-traditional input/output (IO) points, such as other types of wired or wireless process networks or field devices, to the local fieldbus network. The remote fieldbus coupler in embodiments is formed as a modular fieldbus coupler that includes a gateway module and one or more coupler modules, each coupler module for connecting to a foreign fieldbus network or foreign field device. The gateway module acts as a field node on the local fieldbus network drawing power from the fieldbus loop to power the gateway module and the local bus, and handling communications between the fieldbus network and the local bus. Each coupler module has either terminals for wired connection via a wired coupler spur to the foreign fieldbus network or foreign fieldbus device or an antenna for wireless connection to the foreign fieldbus network or foreign fieldbus device. The coupler module draws power from the local bus and uses the local bus for data communications between the coupler module and the gateway module. The coupler module may also include circuitry to power the coupler spur or antenna from the local bus.

The coupler spur or antenna connection may use a different fieldbus protocol than does the local fieldbus to which the gateway module is attached. The coupler spur communications circuitry would handle any needed data translation from the local fieldbus data protocol and the coupler spur or antenna protocol.

Disclosed in yet another aspect of the disclosure is a fieldbus diagnostic device that includes an oscilloscope. The diagnostic device communicates through the fieldbus network and in preferred embodiments is powered solely through the fieldbus network.

The oscilloscope has user-selectable triggers that each initiate storage and later transmittal of data generated by the oscilloscope taking a "snapshot" or "trigger window" of the fieldbus network communications. By "snapshot" or "trigger window" it is meant the oscilloscope samples and stores for data transmittal through the fieldbus network diagnostic data representing a finite time interval or time slice of the fieldbus data communications. It is not necessary for the oscilloscope to transmit a steady data stream.

In preferred embodiments of the oscilloscope, the user selects the oscilloscope sampling rate. If a high-resolution snapshot is desired, a relatively high sampling rate is selected. If a low-resolution snapshot is acceptable, a relatively low sampling rate is selected. The user trades off the amount of data (and hence the time required to communicate all that data over the fieldbus network) for the resolution of the transmitted data.

The diagnostic device may return data representing the voltage and a time stamp or other unique identifier that is associated with the data generated by the oscilloscope. This enables the user to recreate the shape of the waveform for visual display or other analysis, and enables the diagnostic device to re-send data in the event transmission of a data point fails for whatever reason.

In yet other embodiments the diagnostic device performs further numerical analysis or manipulation of the oscilloscope data to reduce the amount of diagnostic data transferred from the diagnostic device over the fieldbus network.

For example, in some embodiments the diagnostic device generates an image in a standard image format from the oscilloscope data. Instead of transferring the oscilloscope data over the fieldbus network, the diagnostic device transmits the image data over the fieldbus network.

In yet other possible embodiments, the diagnostic device generates a report summarizing analysis of the oscilloscope snapshot data. The report may be generated in a standard text format that is transmitted over the fieldbus network instead of the oscilloscope data. In yet further possible embodiments, the diagnostic device may generate a simple Boolean "yes"/"no" or "pass"/"fail" value from the oscilloscope data, with the Boolean value transmitted over the fieldbus network instead of the oscilloscope data.

In additional other possible embodiments of the diagnostic device, the diagnostic device includes a spectrum analyzer that transforms time-domain data to frequency-domain data using, for example, conventional Fast Fourier Transform analysis. Frequency-domain data provides valuable information concerning performance of the fieldbus network and transmitting time-domain data or results of analysis of time-domain data can also reduce the demand on the fieldbus network as compared to transmitting the oscilloscope data.

A fieldbus diagnostic device having an oscilloscope that is powered by the fieldbus network and communicates over the fieldbus network can be placed on the fieldbus network in the process environment where the field devices are located and where the network environment is harshest, remote from the fieldbus power supply and host. This enables the oscilloscope to sample the network at a location representing the best indication of the health of the fieldbus network as a whole, enabling better prediction and prevention of network downtime.

Other objects and features of the disclosure will become apparent as the description proceeds, especially when taken in conjunction with the accompanying drawing sheets illustrating embodiments of the teachings made herein.

BRIEF SUMMARY OF THE DRAWINGS

FIG. 1 illustrates a convention fieldbus communications stack;

FIG. 2 illustrates conventional encoding of data for a fieldbus network;

FIG. 3 illustrates a conventional AC voltage signal transmitted by a fieldbus network;

FIG. 4 is an enlargement of detail 4 shown in FIG. 3 illustrating signal noise;

FIG. 5 is an enlargement of detail 5 shown in FIG. 3 illustrating jitter;

FIG. 6 is an enlargement of detail 6 shown in FIG. 3 illustrating overshoot and DC offset;

DETAILED DISCLOSURE

Figure 7:
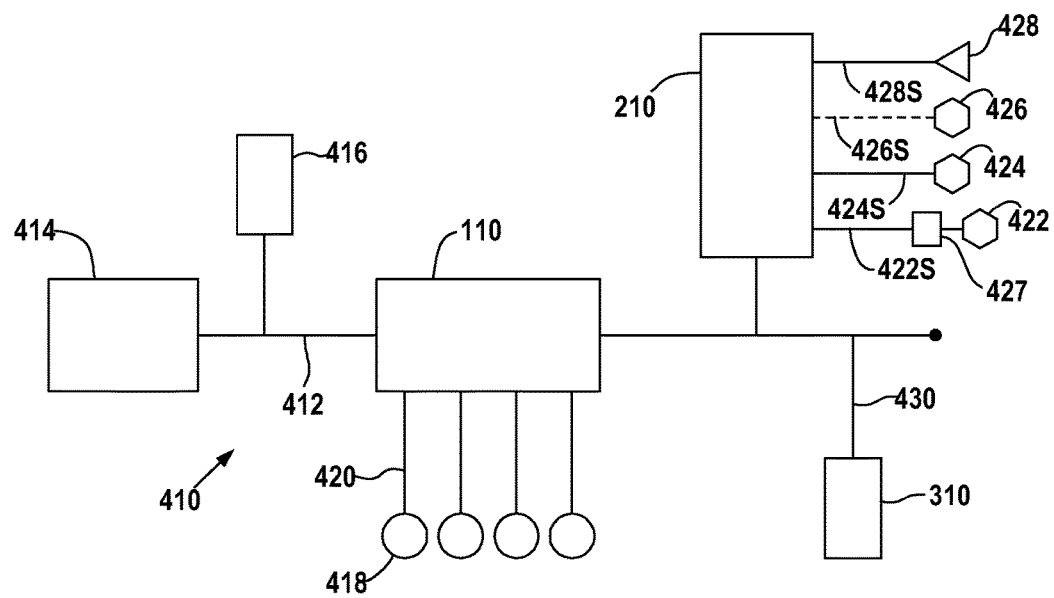
FIG. 7 illustrates a FOUNDATION FIELDBUS H1 network.

FIG. 7 illustrates a FOUNDATION FIELDBUS H1 fieldbus network 410 having a trunk or home run 412 formed as a two-wire loop and powered by a power supply 414 (for clarity, some conventional features of the network such as any required terminating resistors are not shown in FIG. 7). A host 416 is connected to the trunk 412 and communicates with FOUNDATION FIELDBUS H1 field devices 418 connected to spurs 420 extending from the trunk 412. To simplify the drawing each spur 420 is shown as being connected to only one field device 418. These features are conventional and so will not be described in further detail.

The spurs 420 are attached to the trunk 412 by a modular device coupler 110, the device coupler 110 having a spur module (described in more detail below) for each spur 420 connected to the trunk 412. Each spur module includes integrated physical layer diagnostics circuitry dedicated to evaluating the physical properties of the spur attached to the spur module as will be described in greater detail below.

Also attached to the trunk 412 is a modular remote fieldbus coupler 210 that connects non-traditional IO points, such as other types of wired or wireless process networks or field devices, to the fieldbus network 410 as will be described in greater detail below. The fieldbus coupler 210 is shown coupling the FOUNDATION FIELDBUS H1 fieldbus 410 to three foreign networks: a HART network 422, a MODBUS network 424, and a WIRELESSHART network 426. The fieldbus coupler 210 enables network-to-network communications between the fieldbus network 410 and the foreign networks 422, 424, 426.

The foreign networks 422, 424, 426 also each includes a fieldbus coupler (such as a fieldbus coupler 427 connected to the foreign network 422, the coupler 427 being similar to the fieldbus coupler 210) attached to the foreign fieldbus network for network-to-network communications. The fieldbus coupler 210 is connected to the fieldbus couplers attached to the foreign networks 422, 424 by respective wired coupler spur lines 422S, 424S. A coupler spur line such as the spur line 422S may conform to the physical layer specifications of one of the fieldbus networks connected by the coupler spur line or may conform to a physical layer specification of a fieldbus network different from both of the fieldbus networks interconnected by the coupler spur line. For example, the spur line 422S conforms to the HART protocol, and the spur line 424S conforms to the FOUNDATION FIELDBUS H1 protocol.

If the protocol of a coupler spur line attached to the fieldbus coupler 210 is the same as the local fieldbus network to which the coupler 210 is attached, the fieldbus coupler 210 relays data between the local fieldbus network and the coupler spur line without changing the data protocol. If the protocol of a coupler spur line attached to the fieldbus coupler 210 is different from the local fieldbus network, the fieldbus coupler 210 converts the data from one protocol to the other for data transmission between the local fieldbus network and the coupler spur line.

The fieldbus coupler attached to the wireless network 426 communicates with the fieldbus coupler 210 via a "wireless transmission line" represented by a dashed line 426S utilizing a conventional wireless protocol such as, for example, the WIRELESSHART protocol or ZIGBEE protocol.

The fieldbus coupler 210 is also shown coupling the Foundation Fieldbus H1 fieldbus 410 to a PROFIBUS field device 428 via a wired coupler spur line 428S. The coupler spur line 428S conforms to the PROFIBUS physical layer specification. That is, from the point of view of the field device 428, the device 428 is attached to a compatible PROFIBUS network, not to a FOUNDATION FIELDBUS H1 network.

Yet also attached to the network 410 by a spur 430 is a diagnostic field device 310. The diagnostic field device 310 includes an integrated oscilloscope for sampling network data communications via the spur 30 as will be described in greater detail below.

Figure 8:
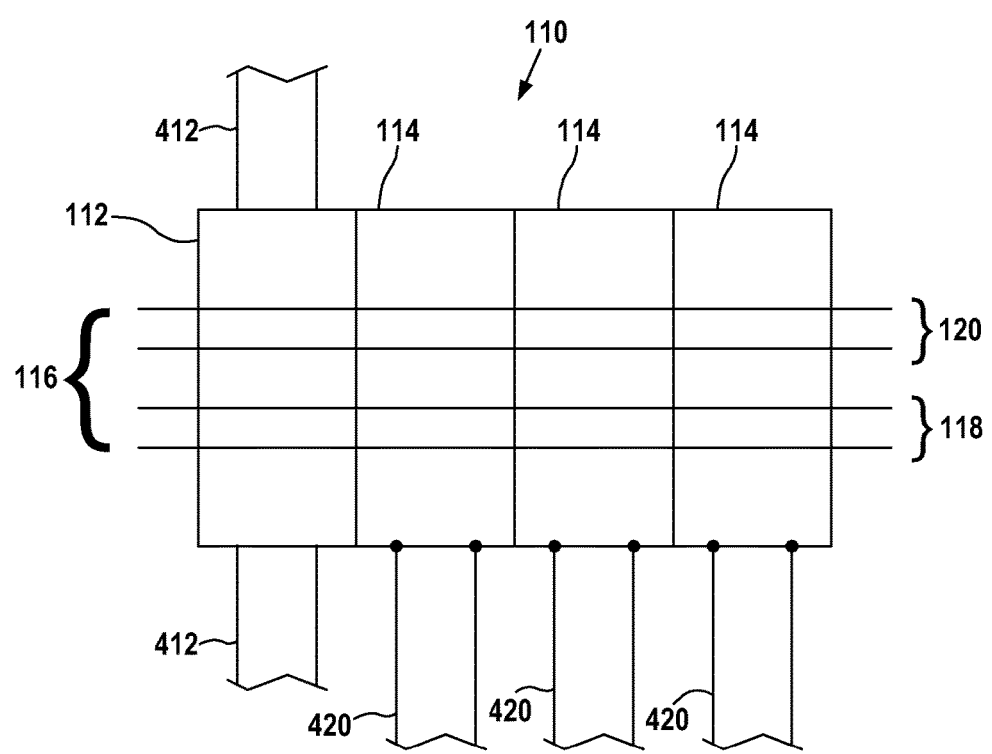
FIG. 8 illustrates a modular device coupler that is attached to the network shown in FIG. 7.

The modular device coupler 110 is shown in FIG. 8 and includes a gateway module 112 and one or more spur diagnostic modules 114. FIG. 8 illustrates the device coupler 110 with three spur diagnostic modules 114, but it is understood that more or less diagnostic modules 114 can be used to form the device coupler 110 as required.

The modules 112, 114 communicate with one another locally via a local bus 116 that includes a local communication bus 118 and a local power bus 120 as described in U.S. Pat. No. 8,180,938 owned by the applicant herein and having one or more common inventors in common with the instant application. The local bus 116 may be a serial connection bus or a backplane type connection system separate from the fieldbus network 410 such as the TBUS (trademark) connection system described in European Patent Publication EP2053697 or US Patent Application Publication 20090194814. A TBUS system enables a defective diagnostic module 114 to be removed and replaced without affecting power and communications to the other diagnostic modules as described in the '938 patent. The gateway module 112 and the one or more device modules 114 can be mounted on a conventional DIN rail (not shown) to connect the modules 112, 114 to the local bus 116.

The device coupler gateway module 112 attaches to the network two-wire loop to be powered from the network two-wire loop and forms a node on the fieldbus network 410 that communicates with the other network nodes (such as the host 416). The illustrated gateway module 112 is shown connected to the network trunk 412 and includes circuitry 122 to power the gateway module 112 from the fieldbus loop and circuitry 124 to power the local power bus 120 from the fieldbus loop. See FIG. 9. The gateway module 112 also includes network communications circuitry 126 to communicate over the fieldbus loop and local communications circuitry 128 to communicate with 0-N diagnostic modules 114 over the local communications bus 118.

The illustrated gateway module 112 is connected in serial with the two-process loop intermediate the ends of the loop. If the gateway module 112 is located at the end of the loop away from the power supply, the gateway module 112 can be provided with an electrical resistor (not shown) to provide termination as is already practiced with conventional, non-modular device couplers.

Figure 10:
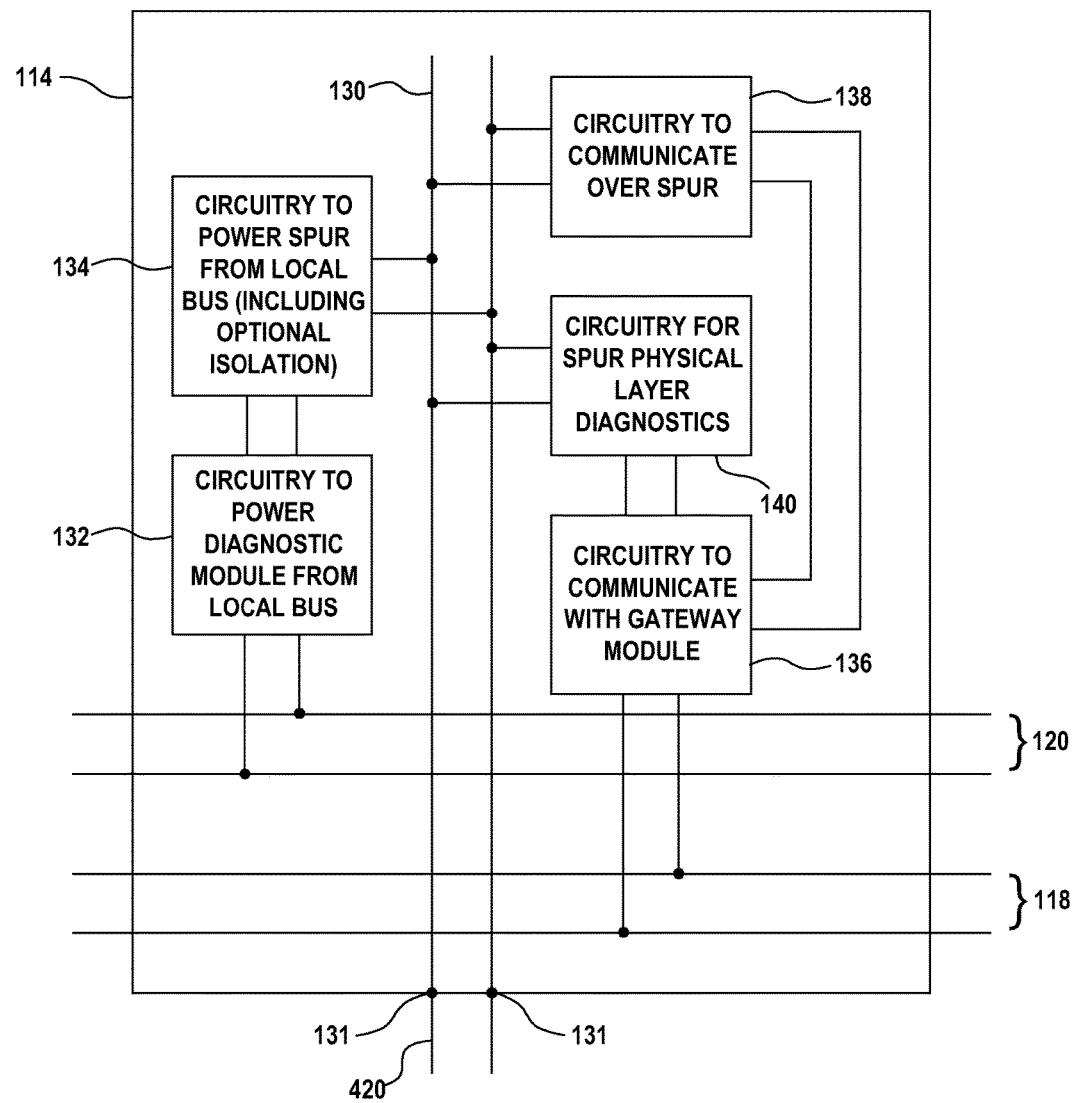
FIG. 10 illustrates a diagnostic module forming part of the modular device coupler shown in FIG. 8.

A diagnostic module 114 is intended to form part of the device coupler 110 for connecting a spur 420 to the two-wire loop 412 utilizing the local bus 116. The illustrated diagnostic module 114 is shown connected to the spur 420 and includes and includes in effect an internal spur segment 130 connected to module terminals 131 for connecting the spur 420 to the diagnostic module 114. See FIG. 10.

The diagnostic module 114 includes circuitry 132 to power the diagnostic module 114 from the local power bus 120 and circuitry 134 to power the spur 420 attached to the device module 114 from the local power bus 120. The spur power circuitry 134 may include isolation circuitry (not shown) to isolate the spur 420 from the local bus 116 and from the two-wire loop 412 attached to the gateway module 112 as described in U.S. Pat. No. 7,940,508 "Inherently Safe Modular Control System" owned by the applicant herein and having at least one inventor in common with the instant application.

The diagnostic module 114 further includes local communications circuitry 136 to communicate with the gateway module 112 over the local communications bus 118 and spur communications circuitry 138 to communicate over the spur 420. The spur communications circuitry 138 is connected to the local communications circuitry 136 to effect communications between the spur 420 and the two-wire loop attached to the gateway module 112.

The power circuitry and communications circuitry of the diagnostic module 114 as described above enables the diagnostics module 114 to act as a device coupler connecting the spur 420 with the trunk 412 with isolation. The diagnostic module 114, however, further includes circuitry 140 connected to the spur segment 130 for spur physical layer diagnostics. The diagnostic circuitry 140 is capable of providing physical layer measurements and information about the spur 420 connected to the terminals 132. The diagnostic circuitry 140 is connected to the local communications circuitry 136 to enable two-way communication between the diagnostic circuitry 140 and the host 416, including the forwarding of diagnostic data back to the host 416.

The diagnostic module 114 in other possible embodiments includes a microprocessor (not shown) programmed to perform analysis of the diagnostic data remote from the host 18 for more efficient utilization of communications and number-crunching resources.

Figure 11:
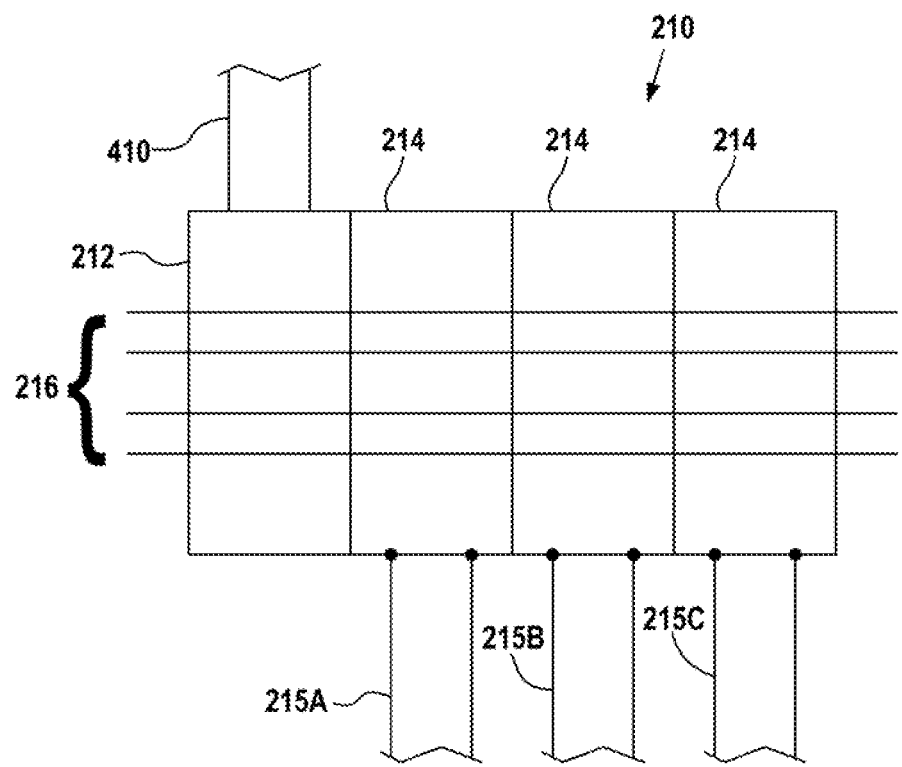
FIG. 11 illustrates a modular fieldbus coupler that is attached to the network shown in FIG. 7.

The modular fieldbus coupler 210 is shown in FIG. 11 and includes a fieldbus coupler gateway module 212 and one or more fieldbus coupler modules 214. FIG. 11 illustrates the fieldbus coupler 210 with the coupler gateway module 212 attached to the local fieldbus network 411 and three fieldbus coupler modules 214 connected to the coupler gateway module 212 through a local bus 216 (like the bus 116). The coupler modules 214 are also attached to respective coupler spurs 215A, 215B, 215C.

The use of the local bus 216 for intermodular communication and power between modules of the foreign coupler 210 is the same as previously described with respect to the bus 116 for intermodular communication of the modules of the device coupler 110 and so will not be described in further detail.

Figure 9:
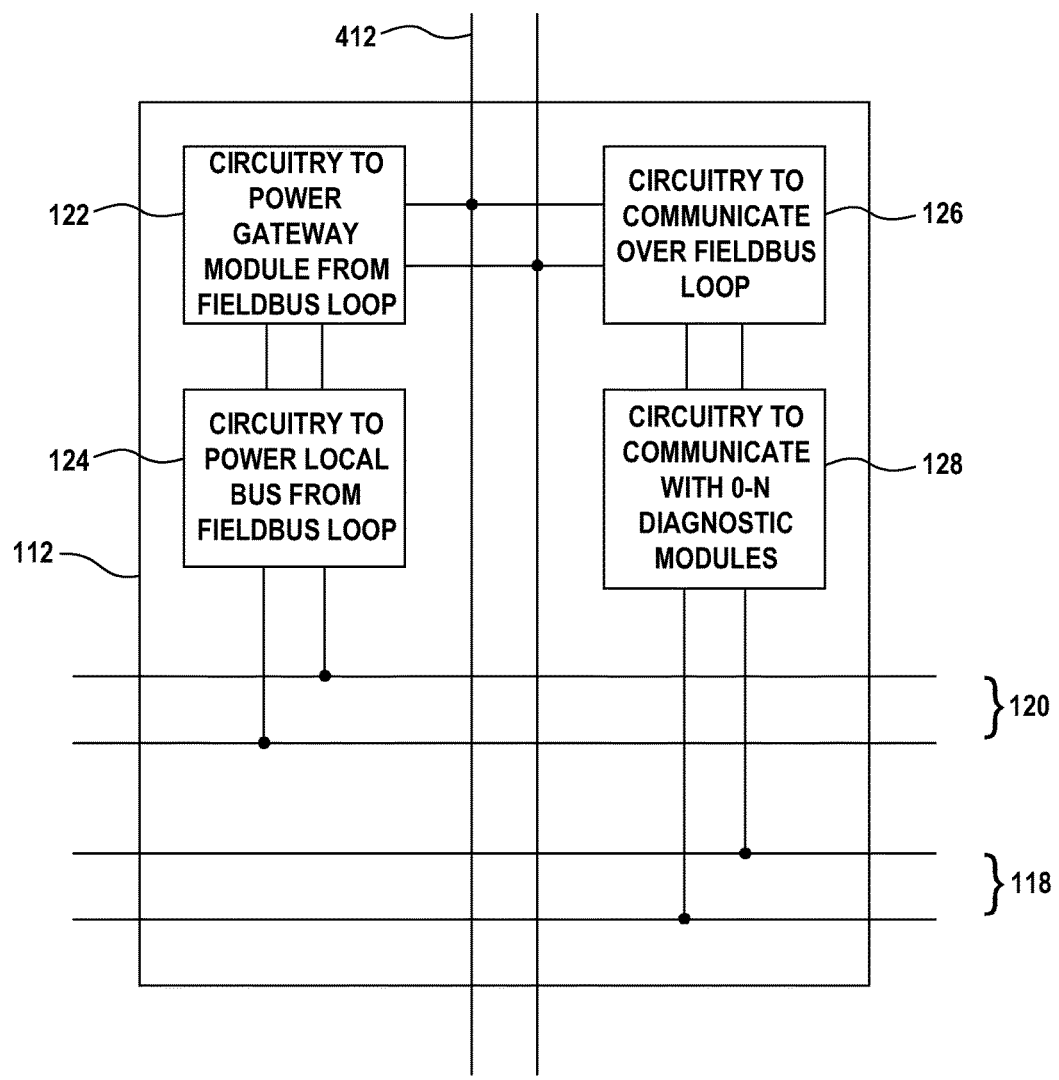
FIG. 9 illustrates the gateway module of the modular device coupler shown in FIG. 8.

The fieldbus coupler gateway module 212 is substantially similar to the device coupler gateway module 112 shown in FIG. 9 but is designed to be a field device only and so does not "pass through" communications and power of the fieldbus trunk. If the fieldbus coupler 210 is designed to pass through local trunk communications as is the device coupler 110, similar termination features could be provided as previously discussed. The fieldbus coupler gateway module 212 communicates with 0-N coupler modules 214 over the local communications bus 216.

Figure 12:
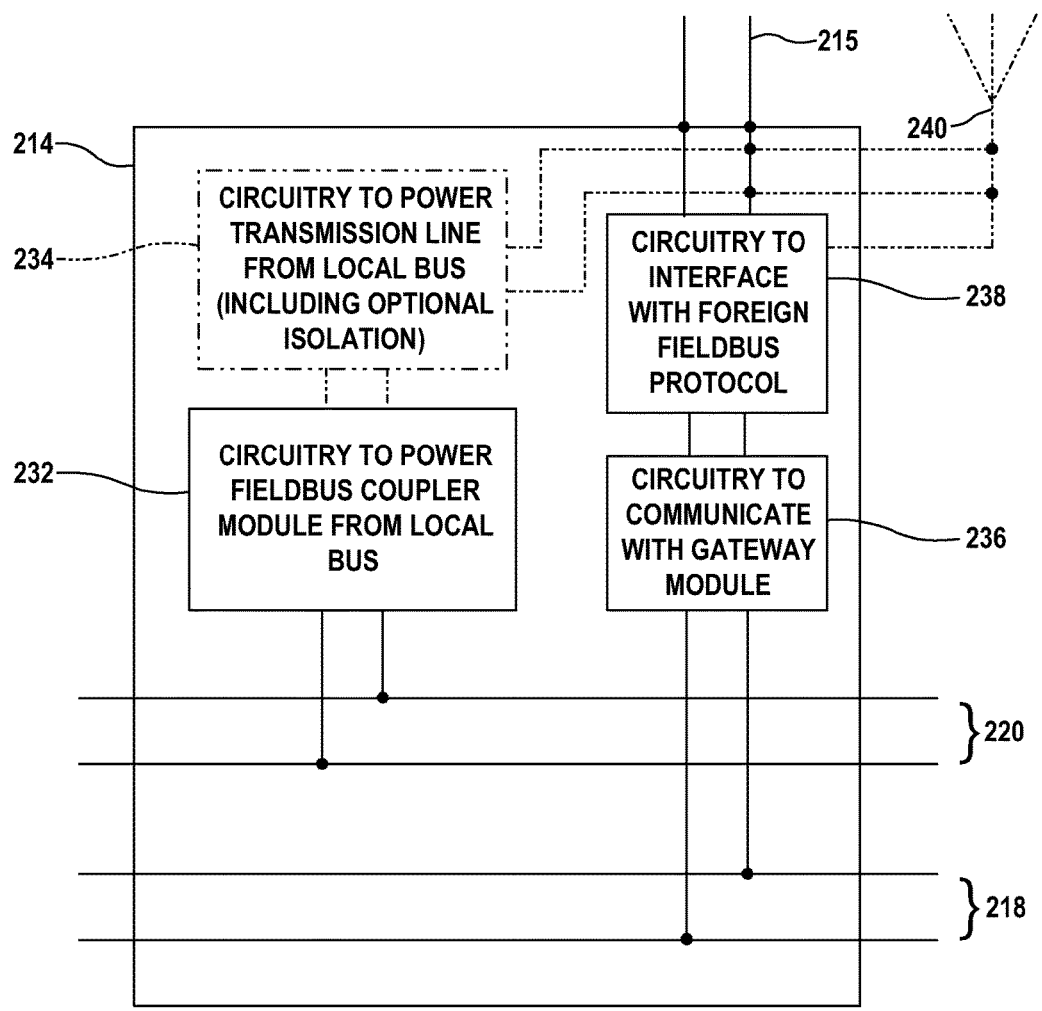
FIG. 12 illustrates a coupler module forming part of the modular fieldbus coupler shown in FIG. 11.

A coupler module 214 is intended to connect a foreign fieldbus network to the local fieldbus network 410 utilizing the local bus 216. The coupler module 214 in FIG. 12 is shown connected to a wired spur 215 for communications between the local fieldbus network 410 and a foreign fieldbus network or foreign fieldbus device (not shown). The foreign fieldbus protocol is not necessarily compatible at a data format level or at the physical level with the protocol of the local fieldbus 410.

The coupler module 214 includes circuitry 232 to power the diagnostic module 214 from the local power bus 220 and, if necessary, circuitry 234 shown in phantom to power the spur line 215 attached to the device module 214 from the local power bus 220. The transmission power circuitry 234 may include isolation circuitry (not shown) to isolate the transmission line 215 from the local bus 216 and the local fieldbus network 410 as previously described with respect to the diagnostic module 114.

The coupler module 214 further includes local communications circuitry 236 to communicate with the gateway module 212 over the local communications bus 218 and transmission communications circuitry 238 for communications over the spur 215 between the coupler module 214 and the foreign fieldbus network. The transmission communications circuitry 238 is connected to the local communications circuitry 236 for communications between the local fieldbus network 410 and the foreign fieldbus network through the foreign fieldbus coupler 210.

If the coupler module 214 is designed for wireless communication between the local fieldbus network and a remote foreign fieldbus network or foreign fieldbus device, the spur 215 represents a wireless transmission line, that is, wireless transmission of data. In such embodiments of the coupler module 214, the transmission circuit 238 is connected to an antenna 240 (shown in phantom in FIG. 12) for wireless sending and receiving of data. Examples of wireless Fieldbus protocols that can be utilized for wireless communication of data include (among others known in the fieldbus art) the WIRELESSHART and ZIGBEE protocols. The circuitry to power a wired spur would be instead configured to power a wireless transmission line, that is, it would be configured to power the antenna 240 as shown in phantom in FIG. 12.

In the illustrated embodiment the local communications circuitry 236 is capable of acting as a node on the foreign fieldbus network and handles the translation of the foreign fieldbus protocol to the local fieldbus protocol. The transmission line 215 is effectively a spur of the foreign fieldbus that is compatible with the physical layer requirements of the foreign fieldbus. The coupler module 214 is seen by the foreign network as another node on the foreign network. Accordingly, the coupler on the foreign fieldbus network attached to the spur 215 can be simply a device coupler for connecting a spur (which may include spur diagnostics as described above). The foreign device coupler could also provide power to the spur 215.

In other possible embodiments the transmission communications circuitry 238 is capable of acting as a node on the local fieldbus network and the corresponding translation of protocols is done on the foreign network utilizing, for example, a coupler module similar to the coupler module 214 like, for example, the coupler module 427 shown in FIG. 7). The transmission line 215 would in effect be a FOUNDATION FIELDBUS H1 spur powered by one of the connected coupler modules and extending from the coupler module 214 to transmission communications circuitry of a corresponding coupler module on the foreign fieldbus network. In an embodiment where the protocol of the local network and the protocol of the connection spur are the same, the transmission communications circuitry 238 does not convert the data between protocols but merely acts to retransmit the data using the same protocol between the spur 215 and the local communications circuitry 236.

In yet other possible embodiments, the spur 215 could be compatible with a third fieldbus protocol different from the local fieldbus network 210 protocol and the foreign fieldbus network protocol. This might be necessary, for example, if the third fieldbus protocol enables a longer spur length or if wireless communication is desired between two wired fieldbus networks. In such embodiments the fieldbus couplers at the ends of the spur translate from the respective local protocol to the third protocol, that is, the third protocol is used solely as an intermediate protocol between the coupled networks.

A coupler module 214 could also include a physical layer diagnostic device or circuitry dedicated to diagnostics of the spur 215 similar to the physical layer diagnostic circuitry 140 of the coupler module 214 that communicates with the local fieldbus through the gateway module 210.

Figure 13:
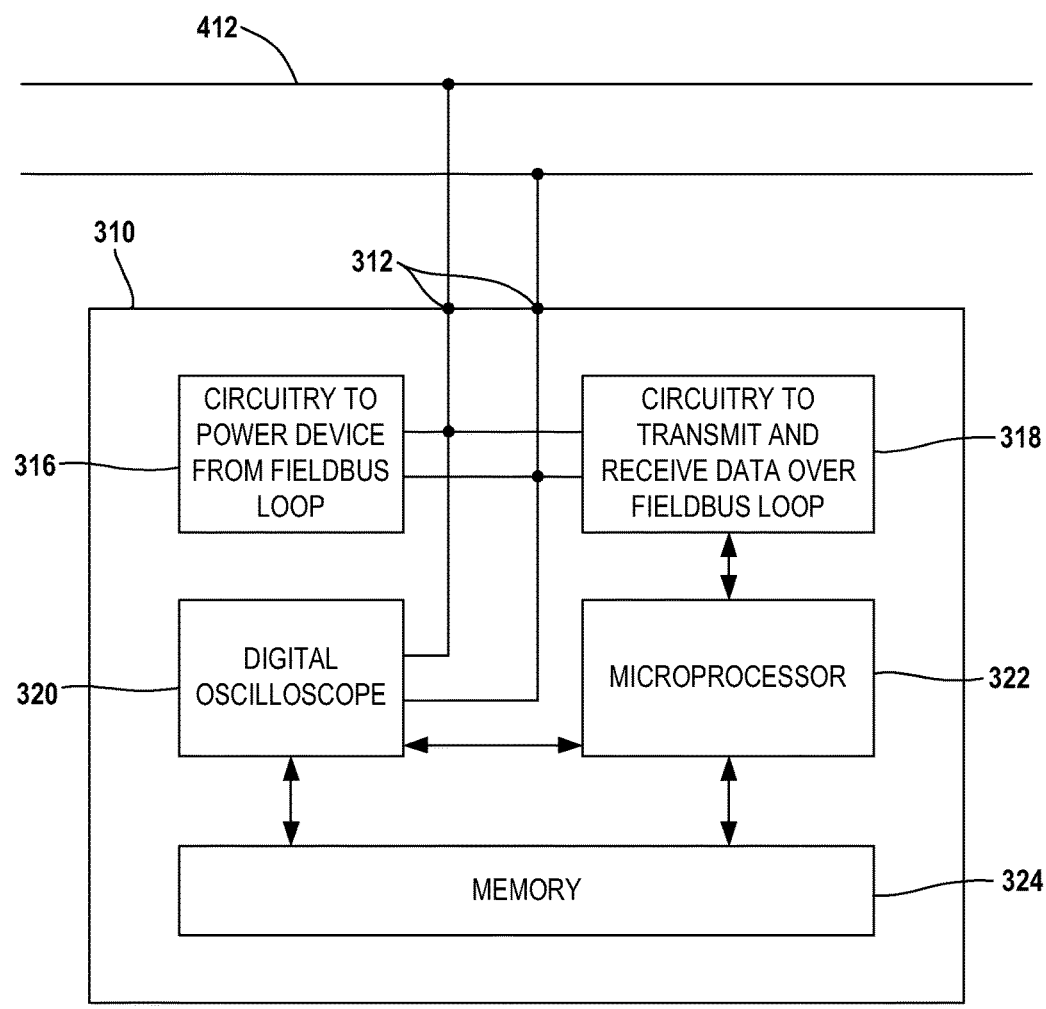
FIG. 13 illustrates a diagnostic field device that is attached to the network shown in FIG. 7.

The diagnostic field device 310 incorporates an integral oscilloscope and is powered by and communicates over the fieldbus loop. FIG. 13 is a functional block diagram of the illustrated field device 310 that includes a set of terminals 312 that electrically connect the field device 310 to the two-wire process loop 412. The field device 310 includes power circuitry 316 connected to the terminals 312 that powers the field device 310 from the two-wire loop 412 and communications circuitry 318 that transmits and receives data over the two-wire process loop 412. The communications circuitry 318 is the sole communications path into and out of the field device 310 and so communications speed is limited by the capabilities of the local fieldbus network 410 itself.

In the illustrated embodiment the field device 310 is powered solely through the two-wire process loop 412. The field device 310 is designed (for a FOUNDATION FIELDBUS H1 compatible embodiment) to run on less than 200 mW of power (that is, less than 30 mA at 9 volts). The illustrated field device 310 preferably meets the industry-standard expectation of a "low power" field device.

The field device 310 includes a digital oscilloscope 320 that is connected to the two-wire process loop 412 via the terminals 312. A microprocessor or controller 322 is connected to the oscilloscope 320 and the communications circuitry 318. The oscilloscope 320 and the microprocessor 322 write to and read from memory 324. The block diagram shown in FIG. 13 indicates that the oscilloscope 320 and the microprocessor 322 share common memory 324, but the oscilloscope 320 and the microprocessor 322 may each have dedicated memory if necessary for performance and compatibility reasons (for example, the oscilloscope 320 may require faster memory than the microprocessor 322).

The field device 310 also includes circuitry for physical layer diagnostics (not shown) that are known in the art that communicate physical layer diagnostic data over the two-wire loop using the communications circuitry 318.

Figure 14:
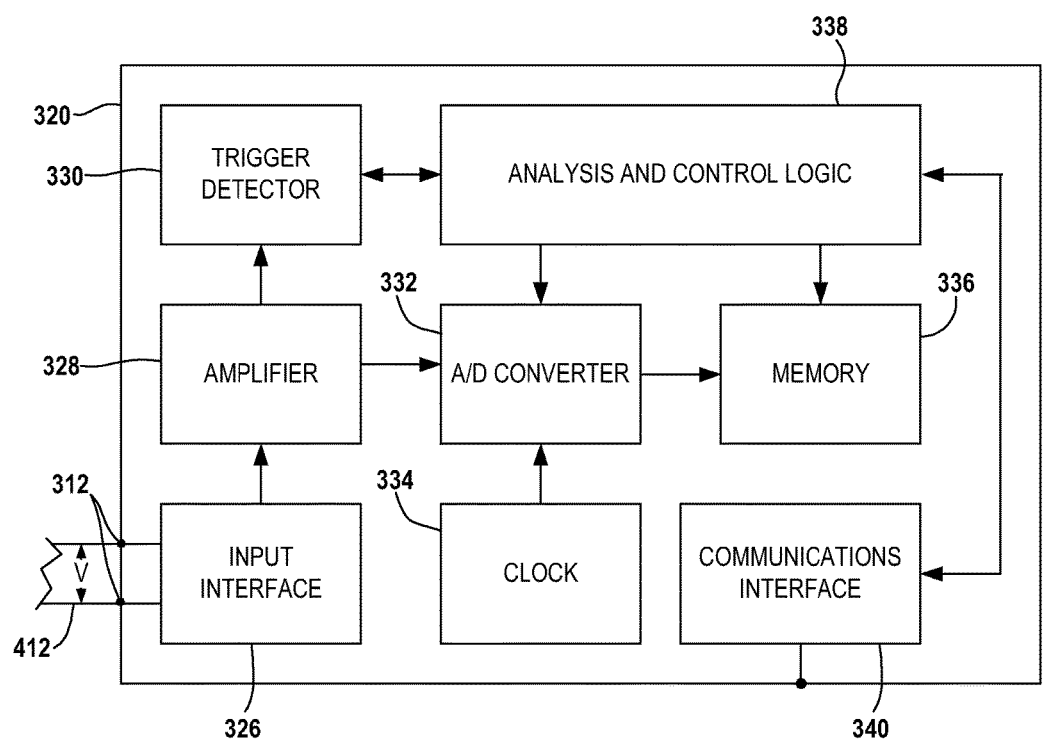
FIG. 14 illustrates the oscilloscope forming part of the diagnostic field device shown in FIG. 13.
Figure 15:
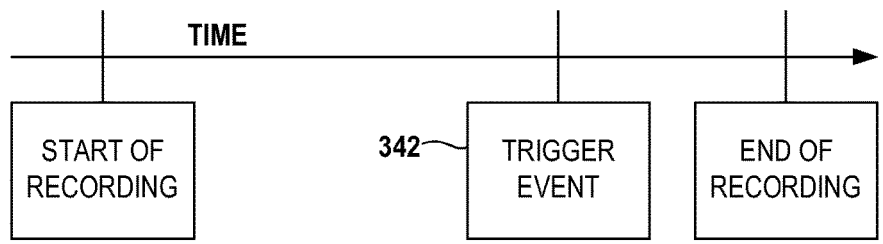
FIG. 15 illustrates an oscilloscope trigger event.

FIG. 14 is a functional block diagram of the oscilloscope 320. An input interface 326 connects the oscilloscope 320 to the terminals 312 and enables the oscilloscope to "see" the voltage V on the two-wire process loop 412. The input interface 326 may be connected to an amplifier 328 that amplifies the incoming voltage signal sufficiently for use by a trigger detector 330 and an analog-to-digital converter 332. The trigger detector 330 detects a trigger event from the input signal and the a/d converter 332 digitizes the input signal at a sample frequency determined by the clock 334. A user via remote command through the fieldbus network can set the sample rate between 100,000 data samples per second to 2,000,000 data samples per second (other embodiments could provide different minimum and maximum sampling rates). The digitized data is stored in the memory 336 (which may be the memory 324). Analysis and control logic circuitry 338 controls operations of the oscilloscope 320 and transmits data and receives control commands through a communications interface 340.

the trigger detector 330 enables the oscilloscope 320 to capture signal data upon the occurrence of an event related to the input signal. The illustrated digital oscilloscope 320 constantly processes the input signal, but the trigger detector 330 alerts the oscilloscope control circuitry 338 to start saving or recording data related to the trigger event in memory. The oscilloscope 320 can also save data that occurs prior to the trigger event because the processed data may be saved in a temporary buffer before being discarded if no trigger event occurs. This is schematically illustrated in FIG. 15 in which a trigger event 342 effectively causes the oscilloscope to save signal data starting some time prior to the trigger event as well as signal data ending some time after the trigger event.

Digital oscilloscope trigger detectors include both simple and advanced trigger types whose trigger parameters can be set by the user. These trigger types known in the digital oscilloscope art that can be implemented by the oscilloscope 320 include, but are not limited to, simple edge triggers (signal falls or rises above a set threshold), complex edge triggers (signal falls and rises between two set thresholds), window triggers (signal waveform enters or leaves a set voltage range), pulse width triggers (signal pulse within a threshold and time duration), interval triggers (signal does not rise above or fall below set threshold within a set time duration), window pulse width triggers (combination of window and pulse width triggers), level dropout triggers (signal having an edge followed by a set time duration without an edge), window dropout triggers (combination of window and level dropout triggers), runt triggers (a signal pulse that crosses a first set threshold but not a second set threshold), spike triggers(signal spike that exceeds a set magnitude), protocol triggers (that the signal waveform complies with a standard data frame protocol such as a FOUNDATION FIELDBUS H1 or PROFIBUS data frame protocol), multi-state triggers (triggering caused by a sequence of individual trigger events), and software triggers (user-defined signal waveforms).

The oscilloscope 320 includes trigger events that cause the oscilloscope 320 to capture and store a limited amount of data for transmission through the two-wire process loop 412. In the illustrated embodiment a single data capture ranges from 3 kilobytes of data for a low resolution, relatively short capture window to about 30 kilobytes of data for a high resolution, relatively long capture window. Intermediate data captures are provided to provide flexibility of detail versus long data transmission times over the fieldbus network. The illustrated oscilloscope 320 sets a default sampling rate based on the type of event being triggered. A high frequency event results in the default selection of a higher sampling rate and a shorter capture window while a lower frequency event results in the default selection of a lower sampling rate and a longer capture window to optimize detail versus data transmission time.

Figure 16:
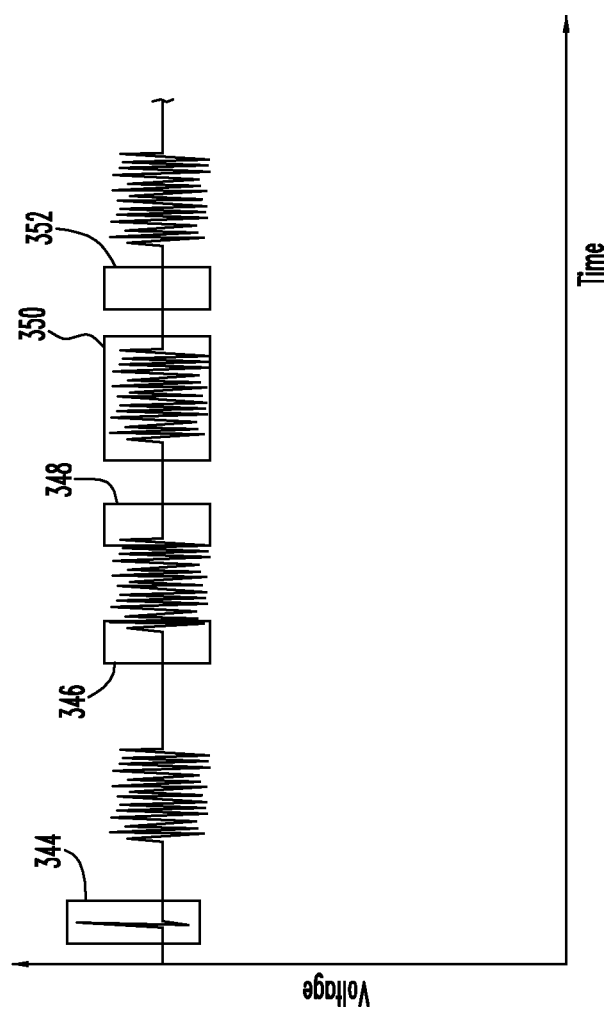
FIG. 16 illustrates other oscilloscope trigger events.

FIG. 16 illustrates some, but not necessarily all, of limited data trigger events that can be recognized by the oscilloscope 320 while monitoring the two-wire process loop 314. These trigger events are represented by "trigger event boxes" whose width along the time axis represents the time interval in which data related to the trigger event is recorded and stored. The amount of data generated and stored sampling an event box is a function of the sampling rate as previously described.

Trigger event box 344 covers a trigger event caused by a voltage spike (positive or negative) that exceeds a specified magnitude and occurs within a given time span. The voltage spike is shown occurring during the quiet time between the transmittal of data frames, but could also occur within a data frame. The oscilloscope digitizes and saves the voltage spike data and also saves pre-spike and post-spike signal data as represented by the width of the trigger event box. Because the voltage spike is a limited duration event, there is a relatively low number of data points generated even at a relatively high sampling rate that would be transmitted from the oscilloscope 320 through the loop 412.

Trigger event box 346 covers a trigger event caused by the start of a data frame. The data recorded covers some of the quiet time immediately before the start of the data frame, and some of the start bits of the data frame (such as the first one or two bits of the preamble of a FOUNDATION FIELDBUS H1 data frame). Trigger event box 348 covers a trigger event caused by the end of a data frame. The data recorded covers some of the end bits of the data frame and some of the quiet time immediately after the end of the data frame (such as the last one or two bits of the end delimiter of a FOUNDATION FIELDBUS H1 data frame). Because the trigger event boxes 346, 348 are each of a relatively short time duration as compared to the data frame as a whole, there is a relatively low number of data points generated even at a relatively high sampling rate that would be transmitted from the oscilloscope 320 through the loop 412.

The oscilloscope 320 also includes trigger events that generate relatively large amounts of data, a user recognizing that selecting such trigger events will require a relatively long time for the oscilloscope 320 to transmit the data through the loop 412 as compared to transmission over a dedicated communication line.

Examples of such larger data trigger events are also shown in FIG. 16. Trigger event box 350 covers a trigger event caused by the transmittal of a data frame. The data recorded covers some of the quiet time immediately before the start of the data frame, the data frame itself, and some of the quiet time immediately after the start of the data frame. Trigger event box 352 covers a trigger event triggered by the quiet time between data frames.

Trigger events can be set up to occur only when a specific user-selected field device transmits data, or can be set up to trigger when an out-of-specification event occurs, or other user-selectable trigger events known in the conventional oscilloscope fieldbus monitoring art.

Figure 17:
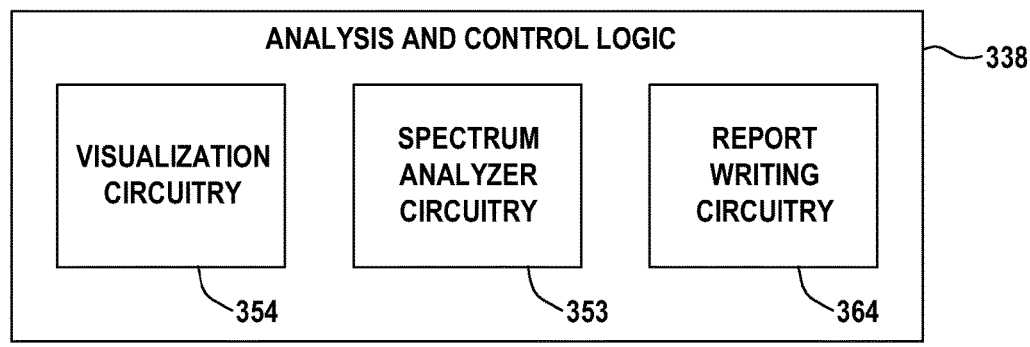
FIG. 17 illustrates some of the components of the oscilloscope's logic and control logic.

In addition to generating time-domain data using the trigger events described above, the analysis and control circuit 338 also includes spectrum analyzer circuitry 353 (see FIG. 17) that transforms time-domain data to frequency-domain data using, for example, conventional Fast Fourier Transform analysis, and saves the frequency spectrum data. Frequency-domain data provides valuable information concerning the physical layer of the fieldbus network. For example, a 50/60 Hz peak suggests noise due to AC mains power line pick-up. Higher frequency peaks may suggest power supply switching noise, digital circuit noise, and the like.

When a user is interested in relatively low frequency peaks as compared to the data signal bit frequency (as for example, a user being interested in 50/60 Hz peaks on a FOUNDATION FIELDBUS H1 network), the oscilloscope 320 can be set to sample data at a lower sampling rate commensurate with the frequency of interest. The oscilloscope 320 could utilize the trigger event box 352 at a low sampling rate to detect 50/60 Hz peaks, and may use data from a number of trigger event boxes 352 to obtain sufficient data for frequency domain analysis.

The oscilloscope 320 may generate relatively large amounts of time-domain or frequency-domain data. Such data may require an unacceptably long transmittal time (to the user) through the loop 314. To reduce transmittal time, the oscilloscope 320 includes additional features that provide effective diagnostic data to the user while reducing transmittal time through the loop 314. The illustrated oscilloscope 320 includes circuitry that generates images that visualize the relevant data and a report writer that generates text based reports based on the relevant data.

The analysis and control logic circuitry 338 further includes visualization circuitry 354 that generates images based on the saved data (time domain data or frequency domain data) and saves the image as a file in a standardized image file format (for example, JPG, TIFF, BMP, GIF, and the like). See FIG. 17. The saved image file can be compressed using conventional image compression techniques.

Figure 18:
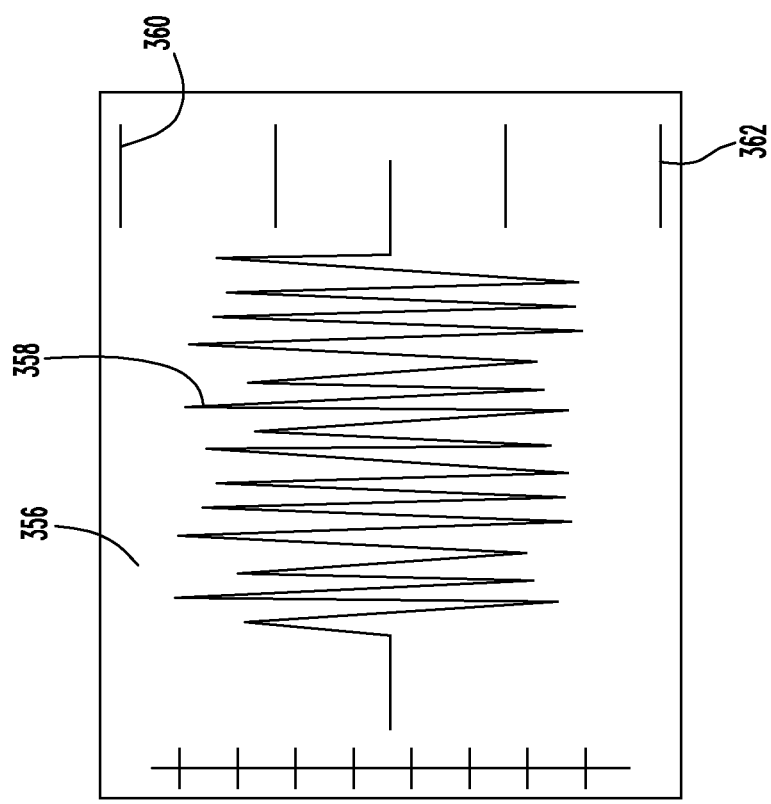
FIG. 18 illustrates an image generated from oscilloscope data gathered from a trigger event.

FIG. 18 illustrates an image 356 stored in an image file that generated from data saved from the trigger event box 350. The image 356 includes the signal data plotted as a curve or function 358, and further includes visualization bounding lines 360 and 362 representing the upper and lower voltage limits of the AC data signal of the fieldbus physical layer specification that assists a user in visualizing how well the data frame complies with the protocol.

The image 356 is not intended to be limiting with respect to how the signal data is plotted, what signal data is plotted, and what other visualization devices, labels or markings can be incorporated into the image to assist a user in evaluating the signal data.

It is contemplated that the oscilloscope 320 will offer the user a number of predefined image types and image formats to choose from. For example, a user could instruct the analysis and logic circuitry 338 to also generate an image using frequency domain data derived from the time-domain data used to generate an image plotting signal strength as a function of frequency.

Referring back to FIG. 17, the analysis and control logic circuitry 338 also includes report writing circuitry 364 that generates text-based reports based on the oscilloscope data. For example, the report text may simply state that the waveform of a data frame 16 complies with the physical layer specifications. The text report is prepared in ASCII or UNICODE format and is transmitted through the loop 314. It is contemplated that the oscilloscope 320 will offer the user a number of predefined report types to choose from in both the time and frequency domains. In yet other possible embodiments the report text may consist of a Boolean data bit indicating "pass/fail" or "yes/no" or other binary criteria.

The field device 310 is configured to transmit an unscheduled data frame or message through the loop 314 according to the unscheduled data transmission protocol of the fieldbus if certain critical trigger events occur. For example, the field device 310 may transmit an unscheduled data frame if a voltage spike exceeds a given magnitude or if the voltage spikes occur at a given minimum frequency.

The field device 310 also receives data from the two-wire loop 412 that includes programming for the oscilloscope 320 and/or the microprocessor 322 that defines new trigger events, image or text-based reporting, utility operations, and the like.

The microprocessor 322 of the field device 310 can perform some or all of the numerical processing, image processing, report processing and the like for the field device 310. In other possible embodiments the microprocessor 322 can be eliminated and the microprocessor functions performed solely by the oscilloscope 320.

In yet other possible embodiments, the field device 310 can include conventional physical layer diagnostic circuitry connected to the two-wire loop 412 through the field device terminals 312 to monitor, measure, and transmit data pertaining to other physical characteristics of the two-wire loop 412 or an attached spur.

In yet further possible embodiments, the field device 310 can be incorporated into a diagnostics spur module 114.

Features of a modular device coupler disclosed herein and illustrated in a nonlimiting embodiment modular device coupler 110 include, but are not necessarily limited to, the following features alone or in any combination with one or more other features:

1. A modular device coupler for a fieldbus network that couples a trunk line that transmits power and data over the network and one or more spurs extending from the trunk line, the modular device coupler comprising:
a gateway module, at least one spur coupler module, and a local bus, the local bus separate from the trunk line;
the gateway module including a first circuit configured to communicate via the trunk line, a second circuit to power the gateway module from the trunk line, and a third circuit configured to communicate with the at least one spur coupler module over the local bus,
each at least one spur coupler module comprising a first circuit configured to power the respective spur coupler module from the trunk line, a second circuit configured to communicate with the spur, and a third circuit configured to communicate with the gateway module via the local bus.

2. The modular device coupler of feature 1 wherein the first circuit of the gateway module is configured to wholly power the gateway module and not any other module.

3. The modular device coupler of feature 1 wherein the gateway module comprises a fourth circuit powering the local bus from the trunk line and the first circuit of each at least one spur coupler module is configured to power the respective spur coupler module from the local bus.

4. The modular device coupler of feature 3 wherein the first circuit of each at least one spur coupler module includes a circuit configured to power a spur attached to the respective spur coupler module.

5. The modular device coupler of feature 4 wherein the first circuit of each at least one spur couple module is isolated from the other circuits of the respective spur coupler module.

6. the modular device coupler of feature 1 wherein the local bus comprises a serial communications bus for communications between the gateway module and each at least one coupler module.

7. The modular device coupler of feature 6 further comprising a backplane connection system configured to transmit communications via the serial communications bus.

8. The modular device coupler of feature 7 wherein only one gateway module is required for communications between the trunk line and each at least one spur coupler module.

9. The modular device coupler of feature 8 wherein an additional one or more spur coupler modules can be attached to the backplane connection system so as to enable communication between the trunk line and an additional one or more spurs.

10. The fieldbus coupler of feature 1 wherein the first circuit of the gateway module is configured to communicate with the trunk using one of the following using one of a FOUNDATION FIELDBUS protocol, a PROFIBUS protocol, a HART protocol, a MODBUS protocol, and an ETHERNET-based protocol.

11. The modular device coupler of any one of the preceding features wherein each at least one spur coupler module comprises a physical layer diagnostics device configured to measure and provide physical layer diagnostics of a spur attached to the respective coupler module.

12. The modular device coupler of feature 11 wherein the physical layer diagnostics device of each at least one spur coupler module is configured to communicate only with the gateway module and not any other module.

13. The modular device coupler of feature 12 wherein all communications between the physical layer diagnostics device of each at least one spur coupler module and the gateway module passes through the local bus.

14. the modular device coupler of feature 11 wherein the physical layer diagnostics device of each spur coupler module is powered solely from the local bus.

Features of a fieldbus coupler disclosed herein and illustrated in a nonlimiting embodiment modular fieldbus coupler 210 include, but are not necessarily limited to, the following features alone or in any combination with one or more other features:

1. A fieldbus coupler for coupling a local fieldbus network utilizing a first fieldbus protocol to a foreign field device or foreign fieldbus network through an interconnecting network transmission line that utilizes a second fieldbus protocol different from the first fieldbus protocol, the fieldbus coupler comprising:
 a first circuit configured to communicate over the local fieldbus network using the first fieldbus protocol;
 a second circuit configured to connect the fieldbus coupler with the interconnecting network transmission line and communicate over the interconnecting network transmission line using the second fieldbus protocol; and
 a third circuit configured to communicate with the first and second circuits and capable of transmitting data to and from the first and second circuits to enable communication between the local fieldbus network and the foreign fieldbus network or the foreign fieldbus device via the interconnecting network transmission line.

2. The fieldbus coupler of feature 1 wherein the second circuit is configured to communicate with the interconnecting network transmission line using a wired fieldbus protocol.

3. The fieldbus coupler of feature 1 wherein the second circuit is configured to communicate with the interconnecting network transmission line using a wireless fieldbus protocol.

4. The fieldbus coupler of feature 1 comprising a fourth circuit configured to wholly power the interconnecting network transmission line from the local fieldbus network.

5. The fieldbus coupler of feature 4 wherein the fourth circuit is electrically isolated from the first circuit.

6. the fieldbus coupler of feature 1 wherein the third circuit communicates with the first circuit through a local bus that is separate from the local fieldbus network.

7. The fieldbus coupler of feature 1 wherein the first circuit is configured to communicate with the local fieldbus network using one of a FOUNDATION FIELDBUS wired protocol, a PROFIBUS wired protocol, a HART wired protocol, a MODBUS wired protocol, and an ETHERNET-based wired protocol, and the second circuit is configured to communicate with the interconnecting network transmission line using a different one of a FOUNDATION FIELDBUS wired protocol, a PROFIBUS wired protocol, a HART wired protocol, a MODBUS wired protocol, an ETHERNET-based wired protocol, a WIRELESSHART wireless protocol, a ZIGBEE wireless protocol, a PROFIBUS wireless protocol, and a FOUNDATION FIELDBUS wireless protocol.

8. the fieldbus coupler of feature 1 wherein the first circuit is capable of two-way communication with both the local field bus network and the third circuit.

9. The fieldbus coupler of feature 1 wherein the second circuit is attached to one end of a network transmission line using the second fieldbus protocol and the transmission line includes a second end attached to a foreign fieldbus device or foreign fieldbus network that also uses the second fieldbus protocol.

10. The fieldbus coupler of feature 1 wherein the second circuit is attached to one end of a network transmission line using the second fieldbus protocol and the transmission line includes a second end attached to a foreign fieldbus device or foreign fieldbus network that uses a fieldbus protocol different from the second protocol.

11. The fieldbus coupler of feature 10 wherein a second fieldbus coupler connects the second end of the transmission line to the foreign fieldbus device or foreign fieldbus network for communications between the transmission line and the foreign fieldbus device or foreign fieldbus network.

12. The fieldbus coupler of feature 1 comprising:
 a gateway module, at least one coupler module, and a local bus;
 the gateway module including the first circuit;
 each of the at least one coupler module comprising the second circuit and the third circuit, each coupler module connectable to a respective interconnecting network transmission line to communicate with the respective transmission line;
 the first circuit communicating with the third circuit of each at least one coupler module via the local bus; and
 the local bus being separate from the local fieldbus network.

13. The fieldbus coupler of feature 12 wherein the gateway module comprises a fourth circuit to power the local bus from the local fieldbus network and each at least one coupler module comprises a fifth circuit to wholly power the at least one coupler module from the local bus.

14. The fieldbus coupler of feature 13 wherein the second circuit of each at least one coupler module is isolated from the third circuit and the fourth circuit of the respective coupler module.

15. The fieldbus coupler of feature 13 wherein each least one coupler module comprises a sixth circuit that wholly powers the interconnecting network transmission line attached to the respective coupler module from the local bus.

16. The fieldbus coupler of feature 13 wherein the sixth circuit of each at least one coupler module is isolated from the second and third circuits of the respective coupler module.

17. The fieldbus coupler of feature 12 wherein the local bus comprises a serial communications bus for communications between the gateway module and each at least one coupler module.

18. The fieldbus coupler of feature 17 further comprising a backplane connection system configured to transmit communications via the serial communications bus.

19. The fieldbus coupler of 18 wherein an additional one or more coupler modules can be attached to the backplane connection system so as to enable communication between the local fieldbus network and an additional one or more foreign fieldbus devices or foreign fieldbus networks.

20. The fieldbus coupler of feature 12 wherein only one gateway module is required for communications between the local fieldbus network and each at least one coupler module.

21. The fieldbus coupler of feature 12 wherein the first circuit of the gateway module is capable of two-way communication with the local fieldbus network and is capable of two-way communication with the third circuit of each at least one coupler module.

22. The fieldbus coupler of feature 12 wherein the at least one coupler module comprises two coupler modules, the second circuits of the two coupler modules configured for different fieldbus protocols.

23. The fieldbus coupler of feature 12 wherein the at least one coupler module comprises two coupler modules, the second circuits of the two coupler modules configured for the same fieldbus protocols.

24. The fieldbus coupler of feature 12 wherein each at least one coupler module comprises physical layer diagnostics circuitry configured to be electrically connected to a transmission line connected to the respective coupler module to provide physical layer diagnostic data for the transmission line.

Features of a fieldbus diagnostics device that includes an oscilloscope disclosed herein and illustrated in a nonlimiting embodiment fieldbus diagnostics device 310 include, but are not necessarily limited to, the following features alone or in any combination with one or more other features:

1. A diagnostics device for a fieldbus network that carries both power and data over a transmission line, the data being transmitted as an electrical signal that includes analog waveforms over the transmission line, the diagnostic device comprising:

a set of terminals configured to electrically connect the diagnostic device with the transmission line;

a first circuit connected to the terminals to communicate via the fieldbus network, the first circuit being the only communications path into and out of the diagnostics device;

a second circuit connected to the terminals to wholly power the diagnostics device from the transmission line without any other source of power; and an oscilloscope connected to the set of terminals to connect the oscilloscope with the transmission line for digitizing waveform data, the oscilloscope powered solely by the power received from the transmission line and connected to the first circuit for data communications into and out of the oscilloscope;

the oscilloscope comprising a trigger detector that generates a user-selectable trigger event defining a trigger event box having a finite duration, a memory, an analog-to-digital converter to digitize the fieldbus signal within the trigger event box, analysis and control logic circuitry coupled with the memory that stores the digitized data in memory, and a communications interface that communicates the memory with the first circuit for communications between the fieldbus network and the oscilloscope.

2. The diagnostics device of feature 1 wherein the diagnostics device is configured to transfer data related to a trigger event box after all the data related to the trigger event box has been stored in memory.

3. The diagnostics device of feature 1 wherein data is transmitted on the network as a data frame with analog waveforms representing a first bit at the start of the data frame, a last bit spaced in time after the first bit at the end of the data frame, and one or more intermediate bits, the trigger detector being configured to open a trigger event box that opens before the start of the first bit and closes before the end of the data frame.

4. The diagnostics device of feature 1 wherein data is transmitted on the network as a data frame with analog waveforms representing a first bit at the start of the data frame, a last bit spaced in time after the first bit, and one or more intermediate bits, the trigger detector being configured to open a trigger event box that opens after the start of the data frame and closes after the end of the last bit.

5. The diagnostics device of feature 1 wherein data is transmitted on the network as a data frame with analog waveforms representing a first bit, a last bit spaced in time after the first bit, and one or more intermediate bits, the trigger detector being configured to open a trigger event box that opens before the start of the data frame and closes after the end of the data frame.

6. The diagnostics device of any one of the features 3-5 wherein the trigger detector is configured to open a trigger event box only upon detecting a waveform generated by a predetermined field device communicating on the fieldbus network.

7. The diagnostics device of feature 1 wherein the trigger device is configured to open a trigger event box that contains a voltage spike that exceeds a predetermined magnitude.

8. The diagnostics device of feature 7 wherein the trigger event box opens before the beginning of the voltage spike and closes after the end of the voltage spike.

9. The diagnostics device of feature 7 wherein data is transmitted on the network as data frames separated by quiet times between data frames, the trigger detector being configured to open a trigger event box that opens and closes during one quiet time.

10. The diagnostics device of feature 1 wherein the oscilloscope comprises a clock that determines a sampling rate of the oscilloscope, the sampling rate being user-selectable between a minimum sampling rate and a maximum sampling rate.

11. The diagnostics device of feature 10 wherein the trigger detector opens a trigger event box that remains open for a duration of time before closing that is inversely proportional to the sampling rate of the oscilloscope.

12. The diagnostics device of feature 1 wherein the analog-to-digital converter generates time-domain data and the analysis and control logic circuitry comprises spectrum analyzer circuitry that generates and stores frequency-domain data from the time-domain data.

13. The diagnostics device of feature 12 wherein the spectrum analyzer circuitry is capable of performing Fast Fourier Transform analysis of the time-domain data.

14. The diagnostics device of feature 1 or feature 12 wherein the analysis and control logic circuitry comprises visualization circuitry configured to generate an image from the oscilloscope data stored in memory and stores the image data in memory.

15. The diagnostics device of feature 14 wherein the visualization circuitry is configured to generate and store an image in at least one of the following image formats: JPG or JPEG format, TIFF format, BMP format, and GIF format.

16. The diagnostics device of feature 14 wherein the visualization circuitry is configured to include labels or markings in addition to the image generated from the oscilloscope data.

17. The diagnostics device of feature 16 wherein the labels or markings are based on the physical layer specifications for the fieldbus network.

18. The diagnostics device of feature 1 or feature 12 wherein the analysis and control logic circuitry comprises a report writer that generates a report from the oscilloscope data stored in memory and stores the report in memory.

19. The diagnostics device of feature 18 wherein the report indicates whether or not the waveform or part of a waveform measured in a trigger event box complies with at least one physical layer specification of the fieldbus network.

20. The diagnostics device of feature 1 wherein data is transmitted on the network as data frames and the data frames transmitted from the oscilloscope to the fieldbus network via the diagnostics device each include data representing a unique identifier that enables the oscilloscope data frames to be placed in the correct time order even if the data frames are transmitted or received out of the correct time order.

21. The diagnostics device of feature 1 further comprising physical layer diagnostics circuitry that is powered solely by the power received from the transmission line and being connected to the first circuit for data communications between the physical layer diagnostics circuitry.

While one or more embodiments have been described, it is understood that this is capable of modification and that the disclosure is not limited to the precise details set forth but includes such changes and alterations as fall within the purview of the following claims.

The invention claimed is:

1. A modular fieldbus coupler for coupling a local two-wire loop fieldbus network utilizing a first fieldbus protocol to one or more foreign fieldbus devices or foreign fieldbus networks through interconnecting fieldbus networks that each utilize a respective second fieldbus protocol different from the first fieldbus protocol, the fieldbus coupler comprising:

a gateway module, a local bus extending from the gateway module, and at least one coupler module, each at least one coupler module being connected to the local bus and communicating with the gateway module through the local bus, the local bus being separate from the local two-wire loop fieldbus network;

the gateway module comprising a first circuit configured to connect to the physical layer of the local two-wire loop fieldbus network and communicate over the local two-wire loop fieldbus network using the first fieldbus protocol, the first circuit capable of acting as a node on the local two-wire loop fieldbus network; and each at least one coupler module comprising a second circuit and a third circuit, the second circuit configured to connect to the physical layer of the respective interconnecting fieldbus network and communicate over the interconnecting fieldbus network using the second fieldbus protocol, the second circuit capable of acting as a node on the interconnecting fieldbus network, the third circuit configured to communicate with the first circuit of the gateway module and the second circuit of the coupler module, the third circuit capable of transmitting data between the first circuit of the gateway module and the second circuit of the said coupler module via the local bus, and the third circuit capable of converting the data from the second fieldbus protocol to the first fieldbus protocol and from the first fieldbus protocol to the second fieldbus protocol to enable communication between the local two-wire loop fieldbus network and the respective interconnecting fieldbus network.

2. The fieldbus coupler of claim 1 wherein the fourth circuit is electrically isolated from the first circuit.

3. The fieldbus coupler of claim 1 wherein the first circuit is configured to communicate with the local two-wire loop fieldbus network using one of a FOUNDATION FIELDBUS wired protocol, a PROFIBUS wired protocol, a HART wired protocol, a MODBUS wired protocol, and an ETHERNET-based wired protocol, and the second circuit of each at least one coupler module is configured to communicate with the interconnecting fieldbus network using a different one of the previously recited protocols.

4. The fieldbus coupler of claim 1 wherein the first circuit is capable of two-way communication with both the local two-wire loop fieldbus network and the third circuit of each at least one coupler module.

5. The fieldbus coupler of claim 1 wherein the second circuit of each at least one couple module is attached to one end of the respective interconnecting fieldbus network.

6. The fieldbus coupler of claim 1 wherein the second circuit of each coupler module is attached to the respective interconnecting fieldbus network and a foreign fieldbus device or a foreign fieldbus network is also attached to the respective interconnecting fieldbus network, the foreign fieldbus device or foreign fieldbus network using a fieldbus protocol different from the second fieldbus protocol of the respective interconnecting fieldbus network.

7. The fieldbus coupler of claim 6 wherein a second fieldbus coupler connects the foreign fieldbus device or foreign fieldbus network to the respective interconnecting fieldbus network.

8. The fieldbus coupler of claim 1 wherein the gateway module comprises a fourth circuit to power the local bus from the local two-wire loop local fieldbus network and each at least one coupler module comprises a fifth circuit to wholly power the at least one coupler module from the local bus.

9. The fieldbus coupler of claim 8 wherein the second circuit of each at least one coupler module is isolated from the third circuit and the fourth circuit of the respective coupler module.

10. The fieldbus coupler of claim 8 wherein each least one coupler module comprises a sixth circuit that wholly powers the interconnecting fieldbus network attached to the respective coupler module from the local bus.

11. The fieldbus coupler of claim 10 wherein the sixth circuit of each at least one coupler module is isolated from the second and third circuits of the respective coupler module.

12. The fieldbus coupler of claim 1 wherein the local bus comprises a serial communications bus for communications between the gateway module and each at least one coupler module.

13. The fieldbus coupler of claim 12 further comprising a backplane connection system configured to transmit communications via the serial communications bus.

14. The fieldbus coupler of claim 1 wherein the local bus provides space for an additional one or more coupler modules to be attached to the local bus.

15. The fieldbus coupler of claim 1 wherein only one gateway module is required for communications between the local two-wire loop fieldbus network and each at least one coupler module.

16. The fieldbus coupler of claim 1 wherein the first circuit of the gateway module is capable of two-way communication with the local two-wire loop fieldbus network and is capable of two-way communication with the third circuit of each at least one coupler module.

17. The fieldbus coupler of claim 1 wherein the at least one coupler module comprises two coupler modules, the second circuits of the two coupler modules being configured with fieldbus protocols different from one another, each different fieldbus protocol also being different from the first fieldbus protocol.

18. The fieldbus coupler of claim 1 wherein the at least one coupler module comprises two coupler modules, the second circuits of the two coupler modules being configured for the same fieldbus protocols.

19. The fieldbus coupler of claim 1 wherein each at least one coupler module comprises physical layer diagnostics circuitry electrically connected to the physical layer of the respective interconnecting fieldbus network to provide physical layer diagnostic data for the respective interconnecting fieldbus network.

20. The fieldbus coupler of claim 1 wherein the respective interconnecting fieldbus network of the at least one coupler modules is a wireless fieldbus network.

* * * * *